United States Patent [19]
Goodman et al.

[11] Patent Number: 5,997,682
[45] Date of Patent: Dec. 7, 1999

[54] PHASE-SEPARATED DUAL-CURE ELASTOMERIC ADHESIVE FORMULATIONS AND METHODS OF USING THE SAME

[75] Inventors: Daniel L. Goodman, Lexington; Catherine A. Byrne, Belmont, both of Mass.

[73] Assignee: Science Research Laboratory, Somerville, Mass.

[21] Appl. No.: 08/978,566

[22] Filed: Nov. 26, 1997

Related U.S. Application Data

[60] Provisional application No. 60/057,708, Aug. 27, 1997.

[51] Int. Cl.$^6$ .................................................. B32B 31/28
[52] U.S. Cl. ............................... 156/273.7; 156/275.5; 156/275.7; 156/331.4; 156/331.7
[58] Field of Search ........................ 156/272.2, 273.7, 156/275.5, 275.7, 331.1, 331.4, 331.7

[56] References Cited

U.S. PATENT DOCUMENTS

| | | |
|---|---|---|
| 2,668,133 | 2/1954 | Brophy et al. . |
| 3,935,330 | 1/1976 | Smith et al. ................................ 522/14 |
| 4,229,562 | 10/1980 | Rogier ........................................ 528/85 |
| 4,342,793 | 8/1982 | Skinner et al. . |
| 4,561,922 | 12/1985 | Peerman et al. ...................... 156/331.4 |
| 5,252,265 | 10/1993 | Cirri . |
| 5,338,588 | 8/1994 | Billiu . |

OTHER PUBLICATIONS

Nelson, K.M., "Composite Sandwich Structural Repairs", *41st International SAMPE Symposium*, pp. 566–579, Mar. 24–28, 1996.

Vlot, A., "Residual Thermal Stresses Around Bonded Fibre Metal Laminate Repair Patches on an Aircraft Fuselage", *41st International SAMPE Symposium*, pp. 888–903, Mar. 24–28, 1996.

Goodman, D.L. et al., "Advanced Electron Beam Curing Systems and Recent Composite Armored Vehicle Results", University of Delaware Center for Composite Materials, Newark, DE.

McConnell, V.P., "Patches Push the Envelope", *High Performance Composites*, pp. 24–28, May/Jun. 1996.

Guyt, C. et al., "Delamination Effects in Fuselage Crack Patching", *41st International SAMPE Symposium*, pp. 902–914, Mar. 24–28, 1996.

Freddel, R. et al., "Repair of C–5 Fuselage Cracking With Bonded Glare Patches", *41st International SAMPE Symposium*, pp. 962–974, Mar. 24–28, 1996.

Saunders, C.B. et al., "Electron and X–Ray Curing For Composite Repair", *Journal SAMPE*, vol. 40, 1995.

"Radiation–Curable Adhesives", pp. 381–384, Woods, Pappas, S.P. eds., 1992.

Cleland, "Radiation Processing of Polymers", pp. 34–38, Singh and Silverman, eds., 1992.

S. Abouzahr and G. L. Wilkes Structure–property behaviour of segmented polyether–MDI–butanediol based urethanes: effect of composition ratio, Polymer 1982, vol. 23, Jul. (Suppl) pp. 1077–1086.

*Primary Examiner*—Michael W. Ball
*Assistant Examiner*—Michael A Tolin
*Attorney, Agent, or Firm*—Wolf, Greenfield & Sacks, P.C.

[57] ABSTRACT

A phase-separated elastomeric adhesive formulation and method of using the same are provided. The phase-separated elastomeric adhesive formulation does not require high temperatures in order to achieve bond strength. The material and methods are particularly advantageous for adhesively bonding both thick and irregularly shaped structures through which relatively low doses of electron-beam energy may not penetrate.

19 Claims, 5 Drawing Sheets

PHASE-SEPARATED DUAL-CURE ELASTOMERIC ADHESIVE FORMULATIONS AND METHODS OF USING THE SAME

This application claims the benefit of U.S. Provisional Application 60/057,708, filed Aug. 27, 1997.

FIELD OF THE INVENTION

The present invention relates generally to the fabrication of structural assemblies and, more particularly, to the bonding of such structures using phase-separated elastomeric adhesive formulations.

BACKGROUND OF RELATED ART

Adhesive bonding is a key process step in the fabrication or repair of many automotive and aircraft structural components. Adhesive bonding can eliminate the need for metal fasteners and their associated local stress concentrations. Most adhesive bonding for structural applications is initiated by application of heat. This is especially true in applications requiring rapid bonding, since adhesive curing is in general a temperature-dependent chemical reaction.

Some recent structural assemblies are composed of materials which melt at low temperatures, such as fiber-reinforced thermoplastic composites. Bonding such materials using heat-curable adhesives is difficult, because the high-temperature air typically used to heat the adhesive can warp or melt the composite. High temperature bonding of subassemblies composed of materials with different thermal expansion coefficients may cause residual thermal stress upon cooling the bonded assembly to room temperature. Composite assemblies with anisotropic coefficients of thermal expansion due to alignment of reinforcing fibers will warp when heated. Composites with complicated geometries, even those composed of isotropic materials, may warp upon heating, leading to debonding or cracking when cooled to room temperature. Some structural assemblies contain low density foam placed between composite shells to provide high stiffness and low weight. The foam can act as insulation material, preventing heat from reaching and curing adhesive bond lines.

In order to bond parts together successfully, particularly those with different coefficients of expansion, adhesive formulations must have a high degree of elastomeric character, which is typically not found in coating formulations. Therefore, in addition to being fully cured and solvent free, adhesives must meet requisite lap shear strength and extensibility values (i.e. high elongation to failure).

U.S. Pat. No. 2,688,133 issued to Brophy et al. on Feb. 2, 1954 discloses adhesives that are radiation curable.

U.S. Pat. No. 5,338,588 issued to Billiu on Aug. 16, 1994 discloses adhesives curable by electron-beam energy in a process for fabricating automotive composite assemblies. Radiation-curable adhesives, particularly electron-beam curable adhesives, are used in many such applications, since a cure may be effected with very little heating, and since electron-beams can penetrate through many materials, including foam, to reach the adhesive. Radiation-curable adhesives are also desirable because of their rapid rates of cure, compatibility with automatic dispensing equipment, and the environmental advantages of solvent-free systems. Generally, radiation-curable adhesives are cured using either ultraviolet energy in combination with a chemical photoinitiator, or electron-beam energy. However, most structural materials, including automotive and aircraft structural assemblies, require the deep penetrating ability of electron-beams as the materials they are formed from are opaque to ultraviolet light. Therefore, radiation-curable adhesives have not been useful in the assembly or repair of automotive or aircraft components, and they have been primarily limited to niche markets in the medical and electronics fields, due to high equipment costs as well as process and safety limitations. For example, the equipment used to generate electron-beams is considerably more costly than that required to generate ultraviolet light, and also requires radiation shielding for personnel safety, which typically consists of thick concrete walls and safety interlocks.

Typical accelerator and shielding costs and a description of the cost tradeoffs are given in the article by Goodman, et. al., "Advanced Electron-beam Curing Systems and Recent Composite Armored Vehicle Results," (Proceedings of The Journal of the Society for the Advancement of Material and Process Engineering (SAMPE) Vol.42, 1997 p.515–525). The relationships between electron-beam dose, energy, current and throughput are given in the review by Cleland ("High Power Electron Accelerators for Industrial Radiation Processing, in Radiation Processing of Polymers," A. Singh and J. Silverman, eds., Oxford University Press, N.Y. 1992, p.34–38).

In electron-beam curing, the system throughput, which is the amount of adhesively bonded material processed per unit time, depends on the rate at which a minimum dose can be delivered to the adhesive bond. Electrons penetrate through a depth of material proportional to their initial energy and inversely proportional to the material density. For beam energies exceeding the threshold needed to penetrate to the adhesive bond, the dose rate is nearly independent of energy and depends only on beam current. As described in the 1997 Proceedings of SAMPE article by Goodman, et. al., the cost of electron accelerator systems are primarily a function of accelerator power, (the product of electron gun voltage and current) and increase rapidly at powers above 10 kW. A process which can substitute lower power electron-beam equipment where higher power equipment was previously thought to be required, will significantly reduce equipment capital costs.

Conversely, if two electron-beam systems possess equal power, and both exceed the minimum energy to penetrate to the adhesive bond, the system with lower beam energy is more efficient, and will have a higher throughput. This is because less beam penetrates beyond the adhesive interface and is wasted in heating the interior of the part. Thus, a process which can substitute lower energy equipment of a given power, where higher energy equipment of equal power was thought to be required, will provide greater throughput, and therefore processing cost advantages.

As shown in the 1997 Proceedings of SAMPE article by Goodman et. al., the required shielding thickness (and therefore facility cost) increases with increasing electron-beam energy. Significant facility cost savings can be made if a process can substitute lower energy electron-beam equipment where higher energy equipment was previously thought to be required. Such a facility will also require less area, or allow larger parts to be processed in the same area, since a smaller fraction of the available space is taken up by the shielding.

Woods et al. disclose dual-cure adhesives that are rendered thermally curable by incorporating a thermal cure initiator capable of producing free radicals on heating, such as, for example, peroxides, azo compounds and disulfides.

Curing of the adhesives typically requires exposure to radiation followed by heating in an oven or by directed heat lamps, typically to temperatures above 60° C., and often above 100° C., in order to activate the thermal cure initiators.

In "Structure-Property Behavior of Segmented Polyether-MDI-Butanediol Based Urethanes: Effect of Composition Ratio," by S. Abrouzahr et. al. in Polymer 23, p. 1077 (1982), polyurethanes are disclosed in which the hard pahse (with a $T_g$ above ambient) and the soft phase (with a $T_g$ below ambient) are well-formed regions which contribute to the elastomeric character at temperatures between the two $T_g$s.

Radiation-sensitive phase-separated elastomeric adhesives are advantageous because they stretch when required to do so and return to their original dimensions upon release of a force. That is, mechanical hysteresis is minimal at appropriate extensions in these materials. In order to provide high elongation to failure values that are required for elastomeric adhesives, phase-separated polyurethane adhesives require well-defined domain structures including both a soft phase and a hard phase. The soft phase must be capable of rubbery behavior between the glass transition temperatures of the two phases, and not lead to extensive phase mixing on extension before break. In order to have soft and hard phases, polymer chain segments long enough to separate into well ordered regions must be present, both in the soft phase and in the hard phase, which typically requires a polyol having a molecular weight of at least 600. Polyols of insufficient molecular weight between cross-linking reactive groups will not be able to phase separate and behave elastomerically.

U.S. Pat. No. 4,342,793 issued to Skinner et al. on Aug. 3, 1982 disclose dual-cure coating compositions that are radiation and thermally curable, and include a radiation-sensitive reactive diluent, a chemical photoinitiator, and a thermally curable portion, reacted together to form an interpenetrating network. The thermal curing is effected with heat generated by a urethane reaction between an isocyanate and a saturated polyol. Both simultaneous and sequentially polymerized networks are present in the adhesive.

Therefore, a need exists for a radiation-curable phase-separated elastomeric adhesive that may be cured at room temperature.

SUMMARY OF THE INVENTION

The invention involves methods and materials to fabricate structures by adhesive bonding, using radiation-curable adhesives. The method is applicable for high throughput bonding of assemblies at low temperature.

An adhesive formulation capable of curing by either radiation or heat is prepared, such that it will cure at room temperature within about 72 hours, independent of the received radiation dose. The dual radiation/heat-curing adhesive is an interpenetrating network resin adhesive prepared by the addition of polyisocyanates to a mixture of radiation-sensitive urethane acrylate oligomer, a radiation-sensitive reactive diluent, hydroxy-containing compounds and isocyanate containing compounds. The cured adhesive has high elastomeric character provided by incorporation of rubbery phase-separated domains.

One embodiment of the invention is a cured adhesive comprising the product of a mixture of a radiation-sensitive urethane acrylate oligomer, a radiation-sensitive reactive diluent, at least one hydroxy-containing compound, and a compound containing isocyanate functionalities. The radiation-sensitive urethane acrylate oligomer and the isocyanate functionalities are polymerizable under radiative conditions. The radiation-sensitive reactive diluent is a liquid with a viscosity in the range of from about 5 to about 50 centipoise containing at least one site of unsaturation. The hydroxy-containing compounds are selected from the group consisting of saturated polyols, partially saturated polyols, diols and triols, and are preferably hydroxy-terminated.

In one embodiment, the compound containing isocyanate functionalities is a polyisocyanate having the general formula:

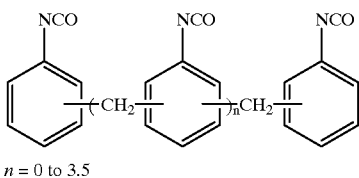

$n = 0$ to $3.5$ where n=0 to 3.5.

In another embodiment, the compound containing isocyanate functionalities is a polyurethane prepolymer having the general formula:

where x =2 to 4, R is selected from the group consisting of alkyl, alkenyl, aliphatic ether, aliphatic ester, aromatic ester, and mixed aliphatic ester and aromatic ester, and Ar is an aromatic diisocyanate or polyisocyanate based upon methylene dianiline diisocyanate, its isomers, homopolymers, oligomers and mixtures thereof.

In one aspect of the invention, the polyurethane prepolymer may be prepared by reacting a hydroxy-terminated polyol with a mixture of diisocyanates and polyisocyanates, in the presence of an excess of the mixture of diisocyanates and polyisocyanates, until all of the hydroxyl groups on the hydroxy-terminated polyol have reacted.

In another aspect of the invention, the polyurethane prepolymer may be fully polymerized, having the general formula:

where x =2 to 4, R is selected from the group consisting of alkyl, alkenyl, aliphatic ether, aliphatic ester, aromatic ester, and mixed aliphatic ester and aromatic ester, $R^1$ is as defined for R, and Ar is a diisocyanate or polyisocyanate based upon methylene dianiline diisocyanate, its isomers, homopolymers, oligomers and mixtures thereof.

When the isocyanate-containing compound used is a polyisocyanate or mixture of polyisocyanates, the cured adhesives are formed using a mixture of about 20 to 70 weight percent of the radiation-sensitive urethane acrylate oligomer, about 10 to 30 weight percent of the radiation-sensitive reactive diluent, about 10 to 60 weight percent of the at least one hydroxy-containing compound, based on the weight of the mixture, and about 90 to 120 percent of the compound containing isocyanate functionalities, based on an isocyanate-hydroxyl equivalent basis. In a preferred embodiment, the cured adhesives are formed using a mixture of about 50 to 60 weight percent of the radiation-sensitive urethane acrylate oligomer, about 20 to 30 weight percent of the radiation-sensitive reactive diluent, about 15 to 25 weight percent of the at least one hydroxy-containing compound, based on the weight of the mixture, and about 95 to 105 percent of the compound containing isocyanate functionalities, based on an isocyanate-hydroxyl equivalent basis.

When the hydroxy-containing compound used is a polyol and the isocyanate-containing compound used is a polyurethane prepolymer, the cured adhesives are formed using a mixture of about 10 to 35 weight percent of the radiation-sensitive urethane acrylate oligomer, about 5 to 15 weight percent of the radiation-sensitive reactive diluent, about 25 to 40 weight percent of the polyurethane prepolymer, and about 10 to 25 weight percent of a polyol, based on the weight of the mixture. In a preferred embodiment, the cured adhesives are formed using a mixture of about 25 to 30 weight percent of the radiation-sensitive urethane acrylate oligomer, about 10 to 15 weight percent of the radiation-sensitive reactive diluent, about 30 to 40 weight percent of the polyurethane prepolymer, and about 10 to 20 weight percent of a polyol, based on the weight of the mixture.

The cured adhesives of the invention comprise a lap shear strength of at least 500 psi and an elongation to failure of at least 50% in a use temperature range of the cured adhesive. In preferred embodiments, the cured adhesive comprises a lap shear strength of at least 750 psi, more preferably at least 1000 psi, and elongation to failure values of at least 75%, more preferably at least 100%.

In one embodiment of the invention, the surface of subassemblies formed by resin injection molding or other fabrication methods are prepared and then coated with the adhesive formulation. The assemblies are then held together by mechanical tooling and exposed to electron-beam radiation. The mechanical tooling is then either moved or removed, and the irradiation process is repeated. The electron-beam equipment is chosen to be of sufficient penetration energy so that the majority of the adhesive is exposed to a minimum adhesive-dependent radiation dose, typically 5–10 MRad. The dose is verified using radiation-sensitive strips whose color can be matched to calibrated standards.

One aspect of the invention provides a method for fabricating a structural assembly involving providing at least two articles having a surface and applying one of the adhesive mixtures described above to at least a portion of at least one of the surfaces. The articles are joining such that the adhesive mixture is positioned between them, and a first portion of the adhesive mixture is partially cured by irradiating at least one of the articles with electron-beam energy, preferably a radiation dose of at least about 3 MRad. A structural assembly is thereby formed in which the at least two articles are adhesively bonded together by the partially cured first portion of adhesive, after which the partially cured first portion is allowed to become fully cured thermally, without radiation.

The method may also involve rotating the structural assembly with respect to the electron-beam energy, partially curing a second portion of the adhesive mixture by irradiating at least one of the articles with electron-beam energy to form a structural assembly in which the at least two articles are adhesively bonded together by the partially cured first and second portions of adhesive mixture, and then allowing the partially cured first and second portions to become fully cured thermally, that is, without radiation.

Preferably, the partially cured adhesive mixture is allowed become fully cured at substantially room temperature within about 72 hours of irradiating.

The cured adhesives of the invention have a use temperature range, and include a plurality of both soft and hard domains. The soft domains having a $T_g$ less than the use temperature range, and the hard domains have a $T_g$ and/or $T_m$ greater than the use temperature range, which provides the cured adhesive with elastomeric character within its use temperature range.

The method provides cured adhesives having lap shear strengths of at least 500 psi and an elongation to failure values of at least about 50 percent within the use temperature range of the cured adhesive. In preferred embodiments, the cured adhesive elongation to failure values of at least about 75 percent, more preferably at least about 100 percent in a use temperature range of the cured adhesive. The method is particularly useful for adhesively bonding irregularly shaped articles.

The foregoing and other objects, features, aspects and advantages of the invention will become apparent from the following detailed description of the present invention when taken in conjunction with the accompanying drawings. For purposes of clarity, not every component is labeled in every figure.

BRIEF DESCRIPTION OF THE DRAWINGS

Various embodiments are described herein with reference to the drawings, wherein.

DETAILED DESCRIPTION OF THE INVENTION

Figure 1:
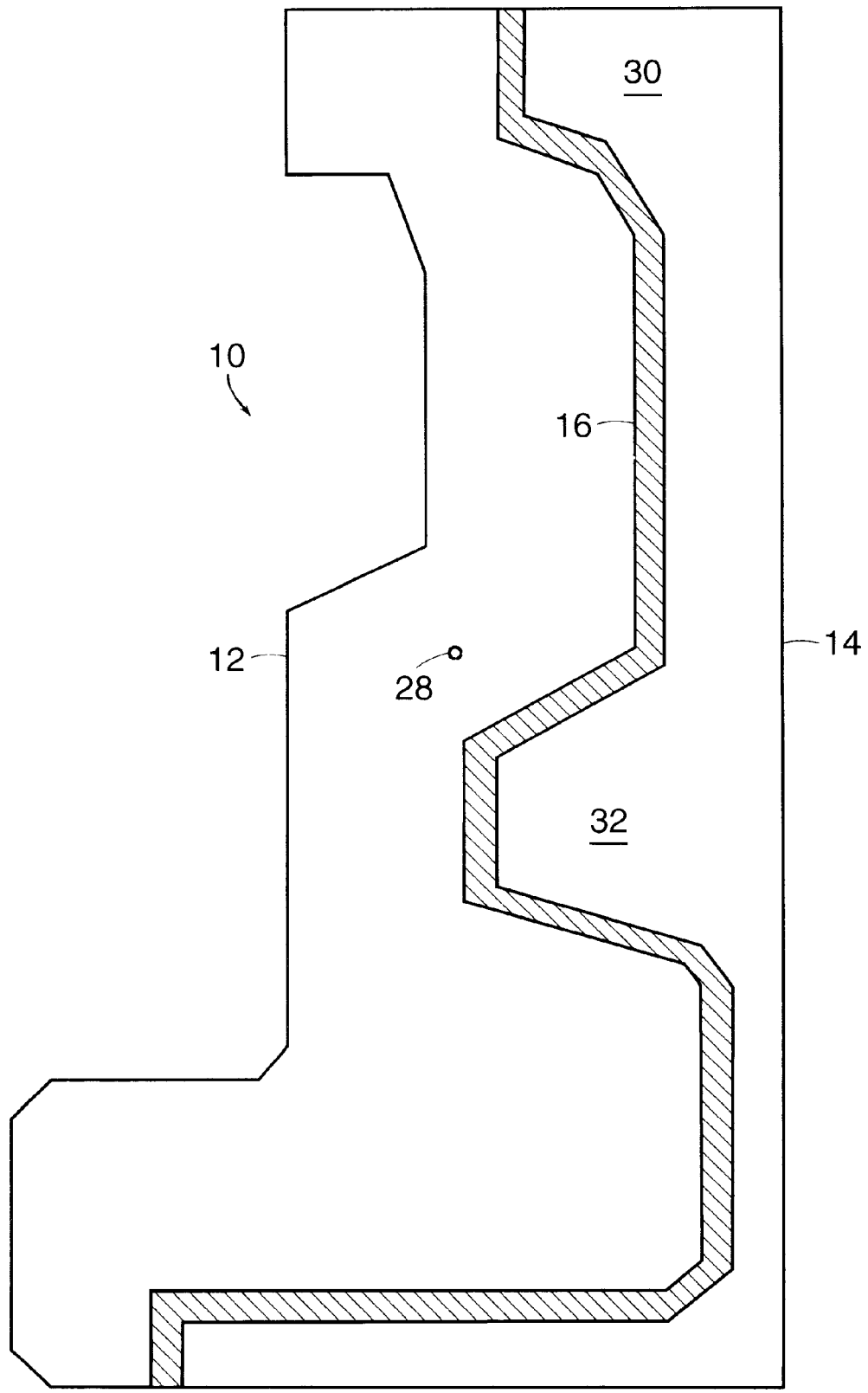
FIG. 1 is an illustration of an irregularly shaped structural assembly formed using the adhesive formulations and methods of the present invention.

The present invention is directed to materials and methods for adhesively bonding composite and/or metal structures. The materials and methods of the present invention are particularly advantageous for bonding together both thick and irregularly shaped composite structures through which relatively low values of electron-beam energy may not penetrate.

One embodiment of the invention is an elastomeric dual-cure adhesive formulation including an interpenetrating network (IPN), having comparable use temperature ranges as conventional high temperature adhesives used for bonding structural assemblies, without slow heating steps and without causing warpage from thermal stresses. The elastomeric dual-cure adhesive formulations of the present invention typically have lap shear strengths of at least 500 psi and tensile elongation to failure values of greater than about 50% within the use temperature range of the fully cured adhesive. "Use temperature range," as used herein, is meant to define a temperature range within which an adhesive maintains the required tensile elongation and lap shear strength values for a given application, and will vary depending on the adhesive and its intended use. Generally, the minimum temperature of the use temperature range is reached when the adhesive becomes too brittle for its intended application, and the maximum temperature is reached when the adhesive loses its strength, i.e., the tensile elongation values fall below the required values for its intended use. "Interpenetrating network" is used herein as defined in by L. H. Sperling, "Interpenetrating Polymer Networks and Related Materials," (Plenum Press, N.Y. 1981, p.3–5). That is, an IPN is any material containing two polymers, each in network form, in which grafts (or covalent bonds) between networks may occur to a greater or lesser extent. Generally, the deliberately introduced cross-linked sites outnumber the accidentally introduced graft sites. The formulations of the present invention include a first network joined by urethane linkages and second network including urethane groups joined by a cross-linked polyacrylate network.

The dual-cure adhesive formulations of the invention are electron-beam radiation curable and heat curable at relatively low temperatures. The elongation to failure values of the formulation are achieved with both soft and hard phase-separated domains in the fully cured adhesive, which ensure that the fully cured adhesive exhibits rubbery dynamic mechanical behavior within its use temperature range. The soft domains comprise mainly miscible groupings of polyol chains of a polyurethane and a urethane acrylate oligomer, and have a glass transition temperature well below the use temperature range of the fully cured adhesive. The hard domains comprise isocyanate diol or triol chains, and/or acrylate polymer chain segments, and have a glass transition and/or a melting temperature above the use temperature range of the fully cured adhesive. Both the hard and soft domain sizes are preferably between about 100 and 500 Angstroms in diameter and have molecular weights between about 600 and 3000. In between the glass transition temperatures of the two domains, the material exhibits rubbery behavior, which allows joining of dissimilar or similar materials and maintenance of the bond strength over the use temperature range of the bonded materials.

Another embodiment of the present invention is a method of adhesively bonding composite parts together using the dual-cure adhesive formulation of the invention. The method involves effecting a "gross cure" by directing electron-beam energy at composite parts to which the dual-cure adhesive formulation has been applied for a period of time to effect a partial cure, followed by effecting a complete cure of the dual-cure adhesive by maintaining the composite parts at substantially room temperature for a period of time. During such time after partial curing and before complete curing, the adhesively bonded composite parts may be handled and assembled, thus eliminating delays associated with long cure times.

The adhesive formulations of the present invention are radiation and heat curable to provide phase-separated elastomeric cured adhesives that include an interpenetrating network. In general, the adhesive formulation includes a radiation-sensitive urethane acrylate oligomer, a radiation-sensitive reactive diluent, a mixture of hydroxy-containing compounds, and a compound containing isocyanate functionalities.

According to one embodiment, the adhesive formulation includes a radiation-sensitive urethane acrylate oligomer, a radiation-sensitive reactive diluent, a mixture of hydroxy-containing compounds, and a polyisocyanate or mixture of polyisocyanates. Preferably, the adhesive formulation includes about 20–70% by weight of the radiation-sensitive urethane acrylate oligomer, about 10–30% by weight of the radiation-sensitive reactive diluent, about 10–60% of the mixture of hydroxy-containing compounds, and about 90–120% on an isocyanate equivalent basis of the polyisocyanate or mixture of polyisocyanates. A preferred embodiment of the adhesive formulation includes about 50–60% by weight of the radiation-sensitive urethane acrylate oligomer, about 20–30% by weight of the radiation-sensitive reactive diluent, about 15–25% of the mixture of hydroxy-containing compounds, and about 95–105% on an isocyanate equivalent basis of the polyisocyanate or mixture of polyisocyanates. The polyisocyanate may be reacted with the hydroxy-containing compounds, and may be aliphatic or aromatic.

In the present embodiment, the radiation-sensitive urethane acrylate oligomer preferably has the general formula (1):

$$R^4(OCONHR^3NHCOOR^1OCOR^2C=CH_2)_x \qquad (1)$$

where $R^1$ is alkyl, $R^2$ is H or $CH_3$, $R^3$ is aliphatic or aromatic, $R^4$ is selected from the group consisting of alkyl, alkenyl, aliphatic ether, aliphatic ester, aromatic ester, and mixed aliphatic ester and aromatic ester, and x=2 to 4.

The radiation-sensitive urethane acrylate oligomer may be prepared by the reaction of a polyurethane prepolymer with a compound containing both a hydroxy group and an acrylate group. Examples of commercially available radiation-sensitive urethane acrylate oligomers are CN 962 and CN 966, available from Sartomer Co., Exton, Pa., BR 423, BR543M, BR582E, BR7432 and STC 3–150, available from Bomar Specialties Co., Winsted, Conn., and Ebercryl 270 and Ebercryl 6700, available from UCB Chemicals Co., Smyrna, Ga.

Also in the present embodiment, the radiation-sensitive reactive diluent is preferably a liquid with a molecular weight in the range of 200 to 400, and a low viscosity, typically in the range of from about 5 to 50 centipoise, which may be used to reduce the viscosity of the radiation-sensitive urethane acrylate oligomer. The radiation-sensitive reactive diluent preferably contains at least one site of unsaturation and becomes part of the cured polymer network. Radiation-sensitive reactive diluents that are monofunctional or difunctional with respect to the radiation-sensitive pi bond functional groups may be used. However, it is preferred that the radiation-sensitive reactive diluents are difunctional in order to ensure that cross-linking rather than linear polymerization is obtained during the radiation curing step.

That is, radiation-sensitive reactive diluents that are not difunctional with respect to the radiation sensitive pi bond may result in no network formation, or incomplete network formation, because a linear polymer chain rather than an IPN will be formed. Examples of radiation-sensitive reactive diluents include, but are not limited to, hexanediol dimethacrylate, tripropylene glycol diacrylate, neopentyl glycol diacrylate, isobornyl acrylate, propoxylated glycerol triacrylate available from UCB Chemicals, Smyrna, Ga., N,N-dimethylacrylamide, available from Advanced Monomer Supply, Inc., Newtown, Pa., isobutoxymethacrylamide, available from Cytec, West Paterson, N.J., and 1-vinyl-2-pyrrolidone, available from International Specialty Products, Wayne, N.J. A particularly preferred radiation-sensitive reactive diluent is tripropylene glycol diacrylate (TRPGDA) available from UCB Chemicals Corporation of Smyrna, Ga.

The mixture of hydroxy-containing compounds may include polyols such as diols and triols, as well as saturated polyols, and preferably include compounds of varied molecular weights, which contributes to the phase-separated elastomeric character of the cured adhesive. Preferably, the mixture of hydroxy-containing compounds includes compounds having a molecular weight of less than about 200, more preferably less than about 100, in combination with compounds having molecular weights in the range of about 600 to about 3000, and more preferably in the range of about 1000 to about 1500. The hydroxy-containing compounds preferably contain from about two to about five hydroxy functional groups, more preferably from about two to about three hydroxy functional groups. When irradiated with electron-beam energy, urethane linkages are formed through the hydroxyl functionalites of the hydroxy-containing compounds and the isocyanate. The lower molecular weight compounds react with the isocyanate groups to form the hard domains, and the high molecular weight compounds form the soft domains. The hydroxy functionality may be positioned anywhere on the hydroxy-containing compound. In preferred embodiments, the hydroxy-containing compounds are hydroxy-terminated. Examples of hydroxy-terminated compounds include diols and triols containing from 2 to 10 carbon atoms, polyethers, including the Poly G series, from Olin, Cheshire, Conn., the Polymeg series from Great Lakes Chemical Corp., Memphis, Tenn., polyesters, including the Desmophen series from Bayer, Pittsburg, Pa., the Stepanpol series from Stepan, Northfield, Ill., the Fomrez series from Witco Corp., Perth Amboy, N.J., and polybutadiene polyol R45M from Elf Atochem, Philadelphia, Pa. A preferred mixture of hydroxy-containing compounds is a mixture of the relatively high molecular weight polyol Poly G20–112 available from Olin Chemical Company of Cheshire, Conn. and the relatively low molecular weight 1,4-butanediol available from DuPont Chemicals, Wilmington, Del.

If desired, the hydroxy-containing compounds may also include up to about 10% by weight of compounds containing both sites of unsaturation and hydroxy groups, such as, but not limited to, hydroxyethyl methacrylate and caprolactone acrylate, both available from Sartomer, hexanediol monovinyl ether, butanediol monovinyl ether, and cyclohexanedimethanol monovinyl ether, available from BASF, Mt. Olive, N.J. As long as these compounds are kept at below about 10%, by weight of the formulation, the phase-separated elastomeric character of the adhesive will be maintained and the elasticity will not decrease.

The compound containing isocyanate functionalities is preferably polyisocyanate, or mixture of polyisocyanates, that may be reacted with the hydroxy-containing compounds to form a urethane linkage, and may be aliphatic or aromatic. Preferably, in order to ensure sufficient cross-linking between the isocyanate and hydroxy functional groups, the compounds containing isocyanate functional groups contain from about two to about five isocyanate groups, more preferably from about two to about three isocyanate groups. Preferably, the polyisocyanates are aromatic compounds including, but not limited to, 4,4'-diisocyanate (MDI), and homopolymers, oligomers, isomers, and mixtures thereof, and diphenylmethane-2,4'-diisocyanate. Other examples include tolylene-2,4-diisocyanate, tolylene-2,6-diisocyanate, naphthalene-1,5-diisocyanate, biphenylene diisocyanate, and triphenylmethane-4,4',4"-triisocyanate. Polyisocyanates based upon MDI are represented by the general formula (1):

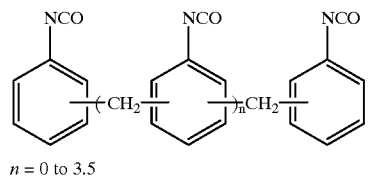

n = 0 to 3.5

Examples of polyisocyanates having the above formula include the PAPI and Isonate series from Dow Chemical, Midland Mich., the Mondur series from Bayer, Pittsburg, Pa. and Rubinate M from ICI Chemicals, Inc., West Deptford, N.J. A preferred polyisocyanate is PAPI 2027.

Better mechanical properties are achieved in polyurethane elastomers based on aromatic polyisocyanates because, in general, aromatic polyisocyanates are more reactive, and react more quickly without catalysts. In addition, the resulting materials may typically be used over wider temperature ranges, especially at higher temperatures.

The amount of the polyisocyanate or mixture of polyisocyanates used in the formulations of the present invention is expressed as a percentage equivalent weight basis with respect to the hydroxyl functionalities of the hydroxy-containing compounds, as is known to those skilled in the art. The hydroxyl functionalities of the hydroxy-containing compounds will react on a 1:1 stoichiometric basis with the isocyanate functionality on the polyisocyanate compound. Preferably, the urethane linkages are formed using from about 90% to 120%, more preferably from about 95% to 105% on a isocyanate-hydroxyl equivalent basis of the polyisocyanate or mixture of polyisocyanates. Mixing the components together outside of the specified range may result in a reduction in adhesive strength of at least about 25%.

Also in the present embodiment, a urethane reaction catalyst may be added, preferably up to about 1% by weight of the formulation, to increase the rate of the room-temperature thermal cure. Higher levels of catalyst may be added, if desired, although it is not necessary. Typical levels of urethane catalysts are from about 0.0001% to about 5% by weight of the urethane-linking components. Typical urethane reaction catalysts include triethylene diamine, piperazine, dibutyltin dilaurate, stannous octoate, stannous laurate and other art recognized urethane catalysts. The catalyst concentration will determine the pot-life of the adhesive, and should be low enough to allow at least 15 minutes of handling time before a significant increase in the viscosity of the mixed adhesive occurs.

Also if desired, up to about 12%, and more preferably between about 8% to about 12% solid components may be added to the formulation in order to provide viscosity control, mechanical reinforcement or toughening. Reinforcement agents are known. Additionally, adhesion promoters such as silanes may also be added, as is common in the field of structural adhesives, to a range of about 0 to 5%, and more preferably about 1–2%.

TABLE 1

Ratios of Adhesive Formulation Components
Based on the Total Weight of the Adhesive Formulation

| Component | Range (wt %) | Preferred Range (wt %) |
|---|---|---|
| Radiation-Sensitive Urethane Acrylate Oligomer | 20–70 | 50–60 |
| Radiation-Sensitive Reactive Diluent | 10–30 | 20–30 |
| Hydroxy-containing Compounds | 10–60 | 15–25 |
| Polyisocyanate or Polyisocyanate Mixture (Ratio on a isocyanate-hydroxyl equivalent basis of the Polyisocyanate or Polyisocyanate mixture) | 90–120 | 95–105 |
| Urethane Reaction Catalyst (Optional) | 0–1 | 0–1 |
| Solids (Optional) | 0–12 | 8–12 |
| Adhesion Promoter (Optional) | 0–5 | 1–2 |

Another embodiment of the invention is an adhesive formulation that includes a radiation-sensitive urethane acrylate oligomer and a radiation-sensitive reactive diluent as described above with reference to the previous embodiment. In the present embodiment, the isocyanate containing compound is preferably a polyurethane prepolymer, and the hydroxy-containing compound is a polyol. Preferably, the adhesive formulation includes about 10–35% by weight of the radiation-sensitive urethane acrylate oligomer, about 5–15% by weight of the radiation-sensitive reactive diluent, about 25–40% of the polyurethane prepolymer, and about 10–25% of the polyol. A preferred embodiment of the formulation includes about 25–30% by weight of the radiation-sensitive urethane acrylate oligomer, about 10–15% by weight of the radiation-sensitive reactive diluent, about 30–40% of the polyurethane prepolymer, and about 10–20% of the polyol.

Suitable radiation-sensitive urethane acrylate oligomers and radiation-sensitive reactive diluents are any of those previously described. A preferred radiation-sensitive urethane acrylate oligomer is 582E available from Bomar Chemical Co of Winsted, Conn. A preferred radiation-sensitive reactive diluent is TRPGDA available from UCB Chemical Co. of Smyrna, Ga.

The polyurethane prepolymer preferably has a general formula (2):

R(OCONHArNCO)$_x$          (2)

where R is selected from the group consisting of alkyl, alkenyl, aliphatic ether, aliphatic ester, aromatic ester, and mixed aliphatic ester and aromatic ester, Ar is an aromatic diisocyanate or polyisocyanate based upon methylene dianiline diisocyanate, its isomers, homopolymers, oligomers and mixtures thereof, and x=2 to 4. The polyurethane prepolymer may also be prepared by mixing the polyol with an excess of a mixture of diisocyanates and polyisocyanates, and allowing the reaction to proceed until all the hydroxy groups have been reacted. Commercially available polyisocyanates include the PAPI series and the Isonate series from Dow Chemical.

In addition, a fully polymerized polyurethane polymer may be added in order to modify the viscosity and/or to balance the volume ratios of the components when used in a kit, which is described in more detail below. Preferably, the fully polymerized polyurethane polymer the general formula (3):

R(OCONH ArNHCOO R$^1$)$_x$          (3)

where R and R' are selected from the group consisting of alkyl, alkenyl, aliphatic ether, aliphatic ester, aromatic ester, and mixed aliphatic and aromatic ester, Ar is a diisocyanate or polyisocyanate based upon methylene dianiline diisocyanate, its isomers, homopolymers, oligomers and mixtures thereof, and x=2 to 4.

Suitable polyols include the hydroxy-containing compounds previously discussed with reference to the previous embodiment. A preferred polyol is Pliogrip 6621 available from Ashland Chemical Co.

A preferred commercially available system which includes a fully polymerized polyurethane prepolymer containing both isocyanates and a urethane prepolymer is Pliogrip 8000 available from the Ashland Chemical Company of Dublin, Ohio.

As described with reference to the previous embodiment, various catalysts, solids, and adhesion promoters may also be added to the present formulation.

TABLE 2

Ratios of Adhesive Formulation Components
Based on the Total Weight of the Adhesive Formulation

| Component | Range (%) | Preferred Range (%) |
|---|---|---|
| Radiation-Sensitive Urethane Acrylate Oligomer | 10–35 | 25–30 |
| Radiation-Sensitive Reactive Diluent | 5–15 | 10–15 |
| Polyurethane Prepolymer | 25–40 | 30–40 |
| Polyol | 10–25 | 10–20 |
| Adhesion Promoter (Optional) | 0–5 | 1–2 |
| Urethane Reaction Catalyst (Optional) | 0–1 | 0–1 |

In another embodiment, the adhesive formulations described above are two-component kits, in which the individual components are mixed in appropriate ratios before dispensing. One embodiment of the kit is based on the first adhesive formulation described above, and contains a first adhesive component preferably including about 20–70% by weight of the radiation-sensitive acrylated oligomer, about 10–60% by weight of the mixture of hydroxy containing-compounds, and about 10%–30% by weight of the radiation-sensitive reactive diluent, and a second adhesive component preferably including about 90–120% on a isocyanate-hydroxyl equivalent basis of the polyisocyanate or mixture of polyisocyanates. A preferred embodiment of the kit contains a first adhesive component including about 50–60% by weight of the radiation-sensitive urethane acrylate oligomer, about 15–25% by weight of the mixture of hydroxy-containing compounds, and about 20%–30% by weight of the radiation-sensitive reactive diluent, and the second adhesive component preferably includes about 95–105% on a isocyanate-hydroxyl equivalent basis of the polyisocyanate or mixture of polyisocyanates.

In another embodiment, the kit is based on the second adhesive formulation described above, and contains a first adhesive component including about 10–35% by weight of the radiation-sensitive urethane acrylate oligomer and about 5–15% by weight of the radiation-sensitive reactive diluent, and a second adhesive component including about 25–40% of the polyurethane prepolymer and about 10–25% of the polyol. A preferred embodiment of the kit contains a first adhesive component including about 25–30% by weight of the radiation-sensitive urethane acrylate oligomer and about 10–15% by weight of the radiation-sensitive reactive diluent, and a second adhesive component including about 30–40% of the polyurethane prepolymer and about 10–20% of the polyol.

As described above with reference to the adhesive formulations, catalysts, solids, and adhesion promoters may be introduced by adding them to either or, to both the first and second adhesive components.

A screening simple test to choose suitable urethane acrylates and reactive diluents involves measuring the strength and elongation to failure of an ultraviolet (UV) cured film of a mixture of the radiation-sensitive components. In general, the lap-shear strength and elongation to failure of the cured adhesive formulations of the present invention are less than the tensile strength and elongation of a cured mixture of the radiation-sensitive components. Such a mixture, when cured, will preferably have a tensile strength exceeding 1000 psi, more preferably exceeding 2000 psi, and an elongation to failure exceeding 40%, more preferably exceeding 100%. The screening test involves mixing a radiation-sensitive urethane acrylate oligomer and radiation-sensitive reactive diluent in a desired ratio and adding a free radical photoinitiator such as Benzophenone (available from Sartomer Company of Exton, Pa.) to the mixture at a concentration of approximately 1% by weight of the mixture. The mixture of the radiation-sensitive components is then applied as a film of about 0.1–0.2 mm in thickness to a flat, non-adherent surface, such as a cast polyester or polyethylene sheet, and then cured using UV radiation. An appropriate source for generating UV radiation for this purpose includes a 300 W/linear inch "D" bulb, of the type manufactured by Fusion Systems of Rockville, Md. UV curing with the "D" bulb involves about two passes over the film at a conveyor speed of approximately 25 ft/min. The film is then demounted and the tensile properties of the thin film are determined as per test standards for tensile strength and tensile elongation according to ASTM Standard D 882. As previously described, adhesive formulations of the present invention, which are suitable for bonding together structural subassemblies will have a tensile strength exceeding 2000 psi and an elongation to failure of at least 40%, more preferably at least 70%, and more preferably still at least 100%.

The dual-cure adhesive formulations of the present invention facilitate the fabrication of a structural assembly 10, as illustrated in FIG. 1. For purposes of illustration only, the method will be described with reference to an automotive structural assembly formed using fiber-reinforced subassemblies and bonded using an adhesive kit formulation described above. It will be understood that the illustrative example is not meant to be limiting, and that the adhesive formulations and methods described below may advantageously be used to adhesively bond together subassemblies formed from multiple materials including, but not limited to, metal, ceramic, fiber-reinforced composite, and combinations thereof.

As shown in FIG. 1, the structural assembly 10 includes a fiber-reinforced composite inner subassembly 12 and a fiber-reinforced composite outer subassembly 14, bonded together by a cured adhesive 16, which may be formed using any of the adhesive formulations or kits described above. The fiber-reinforced subassemblies 12 and 14 may typically be formed by resin injection molding glass-fiber reinforced thermoplastic composites. The cured adhesive 16 preferably possesses sufficient elongation to failure to accommodate the difference in thermal expansion at maximum use temperature of subassemblies 12 and 14, which, for automotive applications, is typically at least about 50%. The adhesive formulations described above may be cured by radiation-induced polymerization and, if not cured in such a manner, may preferably cure to a tack-free solid at room temperature over a period of not less than about one hour and not more than about 72 hours.

Figure 2:
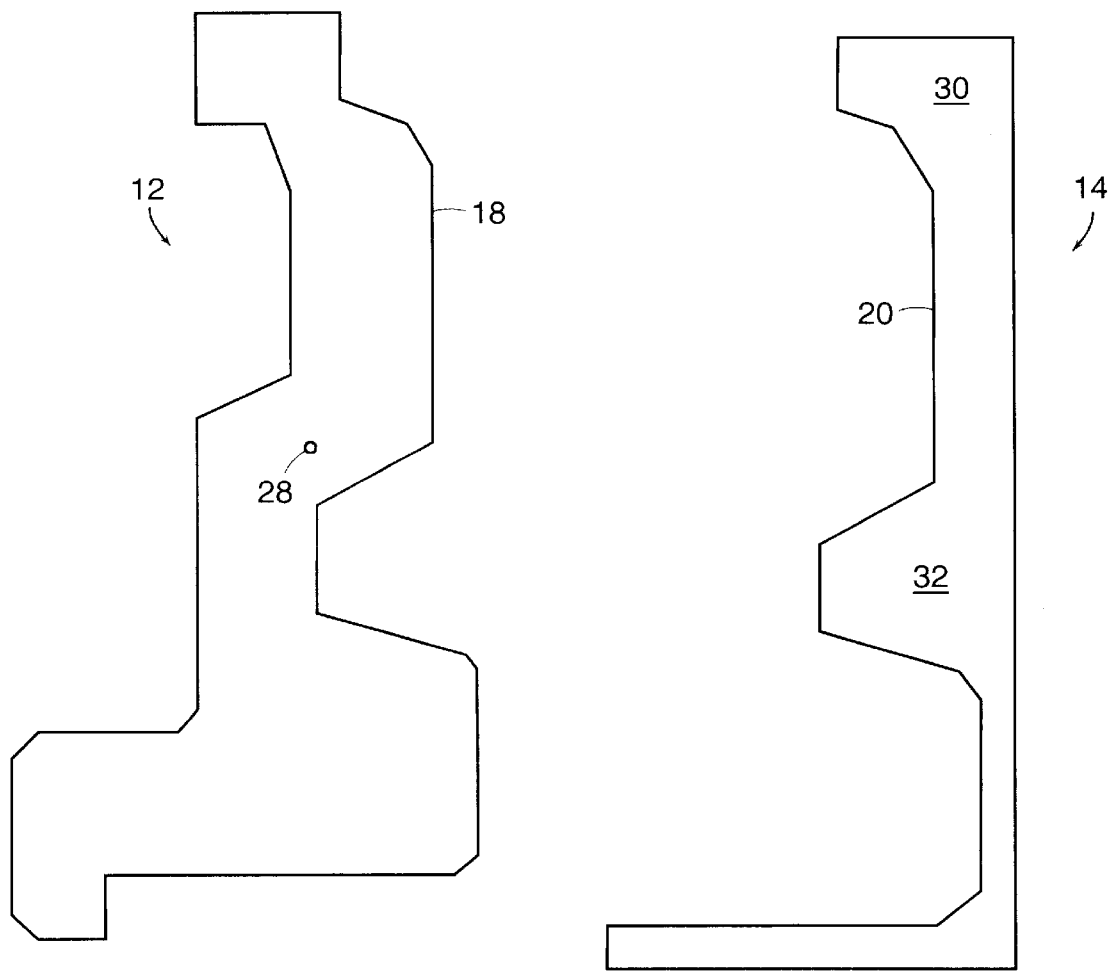
FIG. 2 is an illustration of inner and outer subassemblies used to form the structural assembly of FIG. 1.
Figure 3:
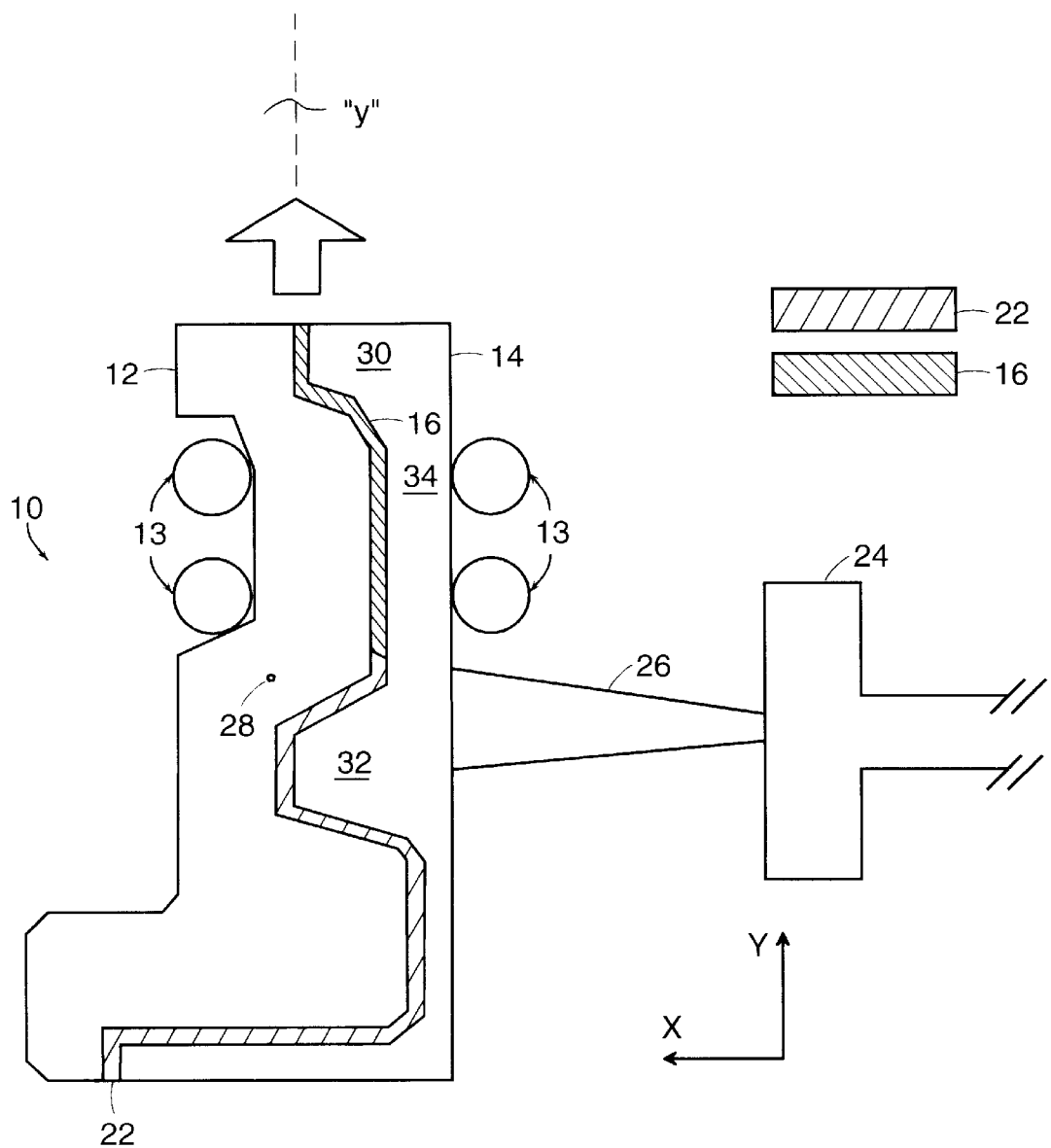
FIG. 3 illustrates the cured and uncured portions of adhesive positioned between the inner and outer subassemblies of FIG. 2 that are formed using an electron-beam radiation source in the X-direction.
Figure 5:
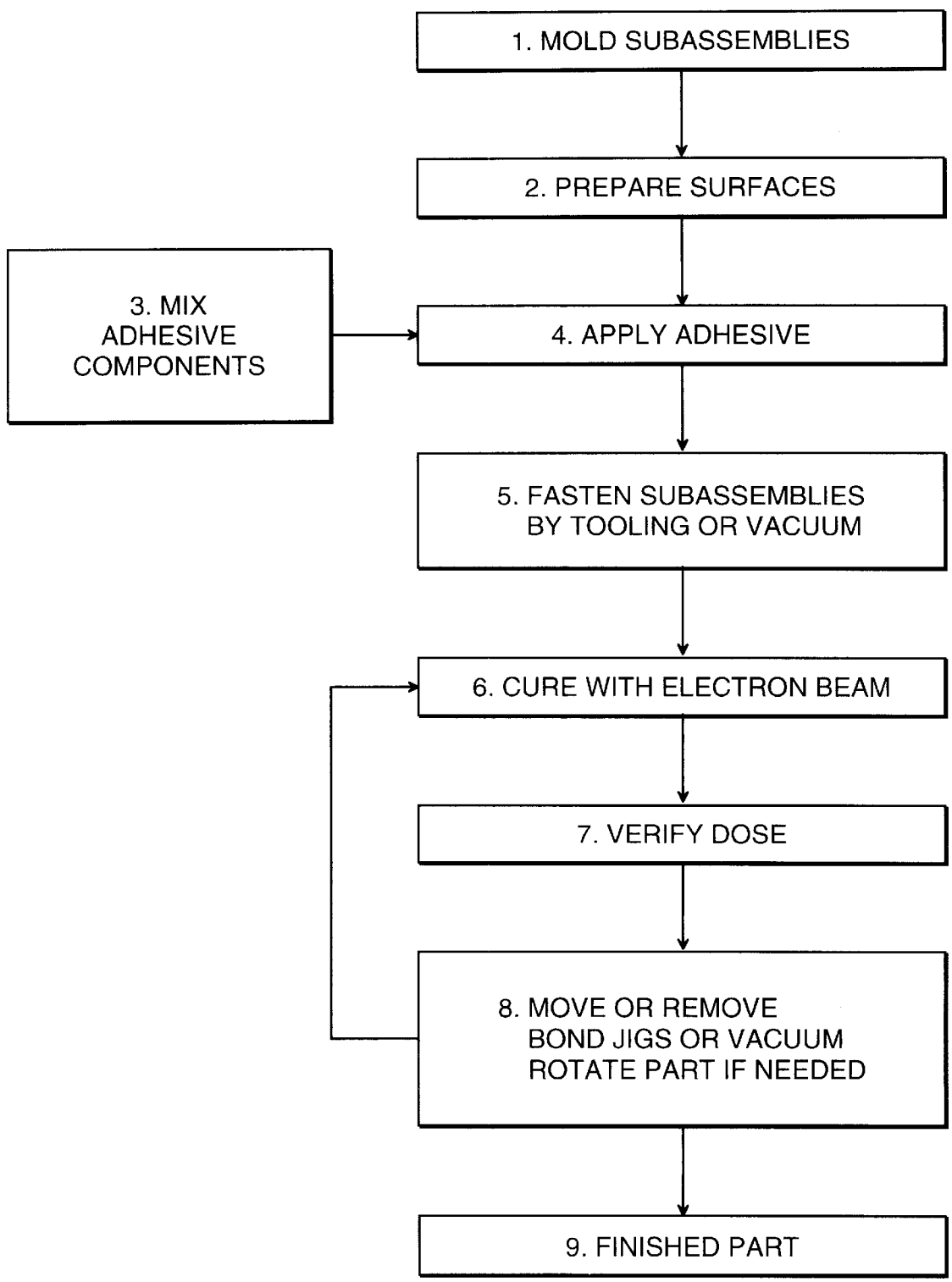
FIG. 5 is a flow diagram of the method of the invention for forming a structural assembly.

FIGS. 1–3, when taken in conjunction with the flow diagram of FIG. 5, illustrate a method of forming the structural assembly 10. The method involves meter-mixing the first and second adhesive components of one of the kits described above to form an uncured adhesive mixture 22, which is then dispensed onto a portion of, or onto the entire bonding surfaces 18 and 20 of inner and outer subassemblies 12 and 14, respectively. The uncured adhesive mixture 22 is preferably dispensed using automatic equipment available from, for example, Liquid Control Corporation of North Canton, Ohio. After the uncured adhesive mixture 22 is applied to the bonding surfaces 18 and 20 of the inner and outer subassemblies 12 and 14, respectively, the bonding surfaces 18 and 20 are placed into contact with each other, thereby forming the structural subassembly 10 (FIG. 3). Preferably, bond jigs 13 are positioned around the structural assembly 10 in order to hold the subassemblies together until a cure has been effected in at least a portion of the adhesive mixture.

The structural assembly 10 is positioned with respect to an electron gun 24 such that the electron gun 24 produces and directs an electron-beam 26 toward the structural assembly 10, which scans the structural assembly 10 at least once in an XZ plane using magnetic deflection coils (not illustrated) while the structural assembly 10 is moved in the Y direction by a conveyor belt or other apparatus (not illustrated). The electron-beam 26 penetrates through outer subassembly 14 and deposits energy in the uncured adhesive layer 22, thereby polymerizing at least a portion of the adhesive.

Preferably, the electron gun 24 is capable of producing a beam of electrons 26 having sufficient energy to penetrate through the thicker regions of subassembly 14, such as, for example, region 30, to reach the uncured adhesive 22 at region 30 in order to provide a minimum dose of electrons. As a practical matter, electron beam energies of greater than about 15 MeV are undesirable because they activate impurities within the sub-assemblies which then become radioactive. Therefore, the maximum practical thickness of subassembly 14 (about 1 inch for a material of typical composite density) corresponds to the penetration of the maximum non-activating electron-beam energy (about 15 MeV). Thus, the thickness of any portion of the outer subsassembly 14 through which an electron beam of a suitable energy (i.e. less than about 15 MeV), is limited to about 1 inch. Therefore, the beam of electrons 26 will not have sufficient energy to penetrate through the thickest regions of subassembly 14, such as, for example, region 32, or through the bonding jigs 13 to shadowed regions 34. Electron guns suitable for curing the adhesive formulations of the present invention include an electron accelerator, a high voltage power supply, a control/interlock system, and scanning horns having thin foil windows for extracting the electron-beam from a vacuum into air. Suitable electron guns are available from Science Research Laboratory of Somerville, Mass. and Power Applications Research of Wallingford, Conn.

To ensure that the adhesive has received the minimum curing dose, which is typically about 3 MRad, radiation-sensitive strips with pressure sensitive adhesive backing may be applied to the structural assembly at various locations prior to irradiation. Total accumulated dose and dose uniformity can be verified by comparing the strip color or optical density at particular wavelengths against preset color standards. Suitable radiation-sensitive strips are available from NAMSA of Northwood, Ohio. As previously described, the minimum dose required to cure the adhesive with radiation is between about 5–10 MRad. The maximum dose required is typically about 15–30 MRad. Exceeding the maximum dose by a factor of 2 to 3 will degrade the strength and modulus of the composite and adhesive materials by the process of polymer chain scission. Many composite materials also darken on exposure to high doses, which is undesirable for cosmetic reasons.

During the radiation-curing process, electron-beam energy penetrates to the bondline where polymerization reactions are initiated, thereby curing the adhesive. "Bondline" refers to the interface of at least two parts between which an adhesive formulation may be positioned. In some instances, electron-beam energy may only reach a portion of, or penetrate the bondline incompletely, due to shadowing. "Shadowing" occurs when an object —part tooling, for example—is placed between a part to be bonded and the electron-beam gun. Shadowing may also cause electron-beam energy to be completely absorbed by an intervening part. Alternatively, if some fraction of the bondline is at a depth greater than the penetration depth of the electron-beam energy, uncured adhesive may be left inside the part. Uncured material may reduce the bond strength or other bond properties such as toughness or maximum use temperature. The presence of uncured material anywhere on or in a part is also undesirable because it yields an unpleasant odor, and physical contact with uncured material may cause allergic reactions in sensitized individuals.

Figure 4:
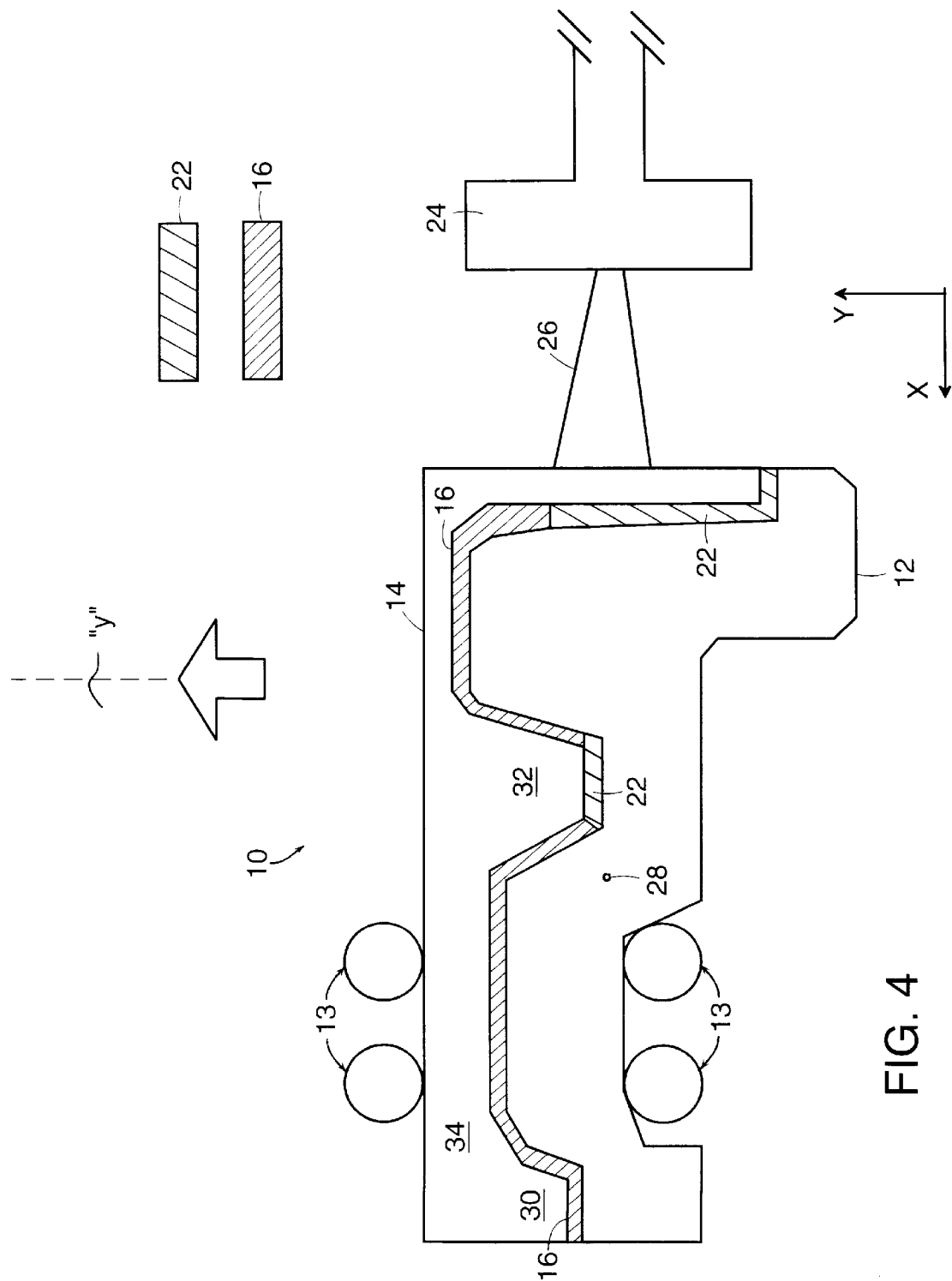
FIG. 4 illustrates the curing of the remaining portions of adhesive positioned between the inner and outer subassemblies of FIG. 2 using an electron-beam radiation source in the Y-direction.

Therefore, in some instances, portions of the uncured adhesive 22 may remain uncured because they remains inaccessible by the electron-beam 26 due to irregular geometry, even after repeated passes. The structural assembly 10 may then be rotated in the XY plane about point 28, then irradiated a second time in order to cure any remaining uncured adhesive 22 which was previously inaccessible by the electron-beam 26. For example, FIG. 4 shows the structural assembly 10 after irradiation with the electron-beam 26 after rotation about point 28, before irradiating a second portion, including cured adhesive portions 16 and uncured adhesive portions 22.

Optionally, the method may also involve surface preparation of the bonding surfaces 18 and 20 of the inner subassembly 12 and outer subassembly 14, respectively, using standard surface preparation techniques such as, for example, a solvent wipe, in order to remove oils or mold release agents. Additional treatments such as flame or corona discharge may be needed to improve the adhesive wetting of low surface-energy materials such as polyolefins.

In another aspect of the method, the bonding jigs 13 may be moved or removed after one or more passes through the electron-beam 26 to facilitate passing those portions 34 that may have been shadowed by the bonding jigs 13 through the electron-beam. Alternatively, this can also be accomplished by alternating two sets of bond jigs on successive passes through the electron-beam.

Following electron-beam irradiation, the structural assembly 10 is removed from the bond jigs 13, or any other supportive tooling. The bond strength of the adhesive should now be greater than approximately 50% of the bond strength when all of the adhesive is fully cured, allowing the structural assembly to be handled by personnel and to be incorporated into larger assemblies such as automotive bodies. During the first 24 to 72 hours following bonding, the assembly must be kept at or above a temperature of 20° C. to complete the thermal cure of adhesive in the thickest, or deepest regions 32 and shadowed regions 34. Full adhesive properties may not be achieved with thermal curing at or below 60° C., unless the material has previously been exposed to electron-beam radiation. In particular, heat curing without prior electron-beam curing will result in adhesive lap-shear strength values of less than 75 percent of the values obtained with both electron-beam and room temperature cure, when measured using the method of ASTM Standard D 1002.

EXAMPLE 1

A dual electron-beam and thermal cure adhesive formulation was prepared using the components and ratios listed in Table 3, below. The adhesive was used to bond a part made from polyvinyl chloride (PVC) plastic onto an epoxy paint-coated steel substrate. The part was exposed to a 1.5 MeV electron beam, directed at the PVC. The thickness of the PVC ranged from 0.06 inches to 0.20 inches. The portion of the adhesive joint at a depth less than 0.10 inch received a dose of approximately 20 MRad. The portion of the adhesive at a depth greater than 0.12 inches did not receive any electron-beam dose, since the electrons did not penetrate to this depth. The unirradiated adhesive was allowed to cure at room temperature for 24 hours. Properties of the bond in the two sections of the part were tested as follows:

Adhesively bonded single lap-joint specimens were prepared as described in ASTM Standard D1002. Polyvinyl chloride (PVC) samples of thickness 0.06 inches were bonded to epoxy paint-coated steel samples using the adhesive listed in Table 3. Half the samples were irradiated using a 1.5 MeV electron beam to a dose of 20 MRad. The other half were left unirradiated. All samples were allowed to age 24 hours at room temperature before measurement by tension loading. The bond strength of the irradiated samples had an average strength of 1400 psi. The unirradiated adhesive was tack-free.

Samples of neat adhesive were prepared from the components listed in Table 3 and injected into dogbone-shaped molds as described in ASTM Standard D638. Samples were either aged 24 hours at room temperature or cured using electrons of energy 1.5 MeV to a dose of 20 MRad and then allowed to age 24 hours. The elongation to failure of all samples exceeded 50%.

This testing shows that the example PVC/steel part meets or exceeds the design requirement of 500 psi lap-shear strength and 50% elongation to failure both in the electron beam-cured and in the room temperature-cured portions of the adhesive bondline.

TABLE 3

| Component | Trade Name | Weight % |
| --- | --- | --- |
| Radiation-Sensitive Urethane Acrylate Oligomer | 582E | 35% |
| Radiation-Sensitive Reactive Diluent | Tripropane glycol diacrylate | 15% |
| Polyurethane Prepolymer/isocyanate mixture | Pliogrip 8000 | 37% |
| Poloyol | Pliogrip 6621 | 12% |
| Adhesion Promotor | methacryloxy silane Z6030 | 1% |

Several formulations were prepared in the same manner as Example 1, using the components and ratios listed below in Table 4.

Example 1 is a comparative example of a formulation including a polyol, a polyisocyanate, and a radiation-sensitive urethane acrylate oligomer. Test results show a lap shear strength of less than 500 psi and a tensile elongation value of less than 50%, indicating little or no elastomeric character. The formulation of Example 1 does not meet the targeted strength and elongations values because it does not include the necessary components for phase separation. That is, the formulation does not include well-defined hard and soft regions. Typically, such adhesives become permanently deformed and do not return to their original length after stretching only a minimal amount, for example, about 10%, up to the breaking point, neglecting a small amount of hysteresis.

The formulation of Example 2 includes the same components as in Example 1, although in different ratios, and additionally a relatively small amount of 1,4-butanediol. The lap shear strength of Formulation 2 is almost twice that of, and has a slight increase in the tensile elongation value, compared to Formulation 1, due to the addition of the 1, 4-butanediol to the mixture. The diol assists in the formation of hard segments of polyisocyanate, allowing it to phase separate from the diol, forming hard domains with glass transition temperatures above the use temperature of the adhesive. The hard domains act as physical cross-links in the elastomeric adhesive which draw the adhesive back (nearly) to its original size when the force is removed.

The formulation of Example 3 includes the same components as in Example 2, although in slightly different ratios, and additionally a relatively low percent of a compound containing both a hydroxy group and an acrylate group, as well as an aminosilane as an adhesion promoter. The caprolactone acrylate crosses from hard to soft domain and in a small percent, roughly doubles the lap shear values, and increases the elongation by a small extent, compared to the formulation of Example 2.

Example 4 is formulated from commercially available components. The formulation includes a prepolymer/isocyanate mixture (Pliogrip 8000), a radiation-sensitive urethane acrylate oligomer (BR582E), a radiation-sensitive reactive diluent (TRPGDA), a polyol mixture (Pliogrip 6621), and an adhesion promotor, methacryloxysilane (Z6030). The resulting elastomeric mixture exceeds both the targeted lap shear strength and percent elongation to failure values.

Example 5 is also formulated from commercially available components. The formulation includes a prepolymer/isocyanate mixture (Pliogrip 8000), a radiation-sensitive urethane acrylate oligomer (STC3–150), a radiation-sensitive reactive diluent (NNDMA), a polyol mixture (Pliogrip 6621), and a mixture of adhesion promoters, Epoxysilane Z6040, methacrylic acid and fluorosurfactant FC430 (3M, Minneapolis, Mn.) are added. As in Example 4, the resulting elastomeric mixture exceeds both the targeted lap shear strength and elongation to failure values.

composite structure may be performed, including, for example, aircraft structures. Therefore, the above description should not be construed as limiting, but merely as exemplifications of preferred embodiments. Those skilled in the art will envision other modifications within the scope and spirit of the claims appended hereto.

What is claimed is:

1. A method for fabricating a structural assembly comprising:
   providing at least two articles, each article having a surface;
   applying a dual-cure adhesive mixture to at least a portion of at least one of the surfaces;
   joining the at least two articles such that the adhesive mixture is positioned between the at least two articles;
   at least partially curing a first portion of the adhesive mixture by irradiating at least one of the articles with electron-beam energy such that a structural assembly is formed wherein the at least two articles are adhesively bonded together by the at least partially cured first portion of the adhesive mixture and a remaining portion remains uncured by the electron-beam energy while the first portion is curing; and
   allowing the remaining portion of the adhesive mixture to become cured thermally.

2. The method of claim 1, further comprising:
   at least partially curing a second portion of the adhesive mixture by irradiating at least one of the articles with electron-beam energy such that a structural assembly is formed wherein the at least two articles are adhesively bonded together by the at least partially cured first and second portions of adhesive mixture before the step of allowing the remaining portion of the adhesive mixture to become cured thermally.

TABLE 4

| Components | Trade Name | 2 | 3 | 4 | 5 | 6 |
|---|---|---|---|---|---|---|
| Polyol | Poly G20-112 | 23.7 | 15.1 | 11.7 | | |
| | 1,4-butanediol | | 2.7 | 2.7 | | |
| Compounds containing carbon-carbon double bonds and hydroxyl groups | SR495 Caprolactone acrylate | | | 3.2 | | |
| Polyisocyanate | PAPI 2027 | 6.3 | 12.2 | 12.5 | | |
| Radiation-Sensitive Acrylated Urethane | BR 582E | 49 | 49 | 49 | 35 | |
| Radiation-Sensitive Acrylated Urethane | STC3-150 | | | | | 37.5 |
| Radiation-Sensitive Reactive Diluent | TRPGDA | 21 | 21 | 21 | 15 | |
| Radiation-Sensitive Reactive Diluent | NNDMA | | | | | 12.5 |
| Adhesion Promotor | aminosilane Z6011 | | | 0.3 | | |
| Polyurethane Prepolymer/isocyanate mixture | Pliogrip 8000 | | | | 37 | 37 |
| Polyol | Pliogrip 6621 | | | | 12 | 12 |
| Adhesion Promotor | methacryloxy silane Z6040 | | | | 1 | |
| Adhesion Promotor | methacrylic acid | | | | | 0.5 |
| Fluorosurfactant | FC 430 | | | | | 0.1 |
| Lap Shear Strength (psi) | ASTM D1002 | 296 | 591 | 1050 | 903 | 1132 |
| Elongation to Failure (%) | ASTM D638 | 20–40 | 50 | 54 | 70 | 60 |
| Use Temperature Range (° C.) | | | | | −40 to +100 | −40 to +100 |

It will be understood that various modifications may be made to the embodiments disclosed herein. For example, although the embodiments disclosed herein are with reference to automotive structures, the bonding of any type of 3. The method of claim 1, wherein the at least partially cured first portion of the adhesive mixture is allowed to become cured at substantially room temperature within about 72 hours of irradiating.

4. The method of claim 2, wherein the at least partially cured first and second portions of the adhesive mixture are allowed to become cured at substantially room temperature within about 72 hours of irradiating.

5. The method of claim 1, wherein the cured adhesive has a use temperature range, and wherein the cured adhesive includes a plurality of soft domains and hard domains, the soft domains having a $T_g$ less than the use temperature range, and the hard domains having a $T_g$ and/or $T_m$ greater than the use temperature range, such that the cured adhesive exhibits elastomeric character within the use temperature range of the cured adhesive.

6. The method of claim 2, wherein the cured adhesive has a use temperature range, and wherein the cured adhesive includes a plurality of soft domains and hard domains, the soft domains having a $T_g$ less than the use temperature range, and the hard domains having a $T_g$ and/or $T_m$ greater than the use temperature range, such that the cured adhesive exhibits elastomeric character within the use temperature range of the cured adhesive.

7. The method of claim 5, wherein the cured adhesive has a lap shear strength of at least 500 psi and an elongation to failure of at least about 50 percent in the use temperature range of the cured adhesive.

8. The method of claim 6, wherein the cured adhesive has a lap shear strength of at least 500 psi and an elongation to failure of at least about 50 percent in the use temperature range of the cured adhesive.

9. The method of claim 5, wherein the cured adhesive has a lap shear strength of at least 500 psi and an elongation to failure of at least about 75 percent in the use temperature range of the cured adhesive.

10. The method of claim 6, wherein the cured adhesive has a lap shear strength of at least 500 psi and an elongation to failure of at least about 75 percent in the use temperature range of the cured adhesive.

11. The method of claim 5, wherein the cured adhesive has a lap shear strength of at least 500 psi and an elongation to failure of at least about 100 percent in the use temperature range of the cured adhesive.

12. The method of claim 6, wherein the cured adhesive has a lap shear strength of at least 500 psi and an elongation to failure of at least about 100 percent in the use temperature range of the cured adhesive.

13. The method of claim 1, wherein the at least two articles are irregularly shaped.

14. The method of claim 25, wherein the at least two articles are irregularly shaped.

15. The method of claim 2, wherein the structural assembly is rotated with respect to the electron-beam energy source before at least partially curing the second portion of adhesive.

16. The method of claim 1, further comprising fully curing the first portion of the adhesive mixture by irradiating at least one of the articles with electron-beam energy such that the at least two articles are adhesively bonded together by the fully cured first portion of the adhesive mixture.

17. The method as in claim 16, further comprising:
fully curing a second portion of the adhesive mixture by irradiating at least one of the articles with electron-beam energy such that the structural assembly is formed wherein the at least two articles are adhesively bonded together by the fully cured first and second portions of adhesive mixture before the step of allowing the uncured remaining portion of the adhesive mixture to cure thermally.

18. The method of claim 17, wherein the remaining portion of the adhesive mixture is allowed to become fully cured at substantially room temperature within about 72 hours of irradiating.

19. A method for fabricating a structural assembly comprising:
providing at least two articles, each article having a surface;
applying an adhesive mixture to at least a portion of at least one of the surfaces;
joining the at least two articles at the surfaces;
curing at least a portion of the adhesive mixture by providing the at least two articles with a radiation dose of at least 3 Mrad while a remaining portion of the adhesive remains uncured by the radiation; and
curing the remaining portion of the adhesive mixture without radiation.

* * * * *